(12) United States Patent
Tsunekawa

(10) Patent No.: US 9,539,875 B2
(45) Date of Patent: Jan. 10, 2017

(54) SUSPENSION INSULATOR

(71) Applicant: TOYOTA JIDOSHA KABUSHIKI KAISHA, Toyota-shi, Aichi (JP)

(72) Inventor: Hajime Tsunekawa, Aisai (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/799,183

(22) Filed: Jul. 14, 2015

(65) Prior Publication Data
US 2016/0089948 A1 Mar. 31, 2016

(30) Foreign Application Priority Data

Sep. 25, 2014 (JP) ................. 2014-194772

(51) Int. Cl.
*F16F 9/00* (2006.01)
*B60G 15/06* (2006.01)
*B60G 11/16* (2006.01)

(52) U.S. Cl.
CPC ............ *B60G 15/068* (2013.01); *B60G 11/16* (2013.01); *B60G 2202/312* (2013.01); *B60G 2204/124* (2013.01); *B60G 2204/128* (2013.01)

(58) Field of Classification Search
CPC .............. B60G 15/068; B60G 11/52; B60G 2202/0312; B60G 2204/124; B60G 2204/128; B60G 11/16
USPC .......... 188/321.11, 266; 267/220, 33, 141.4, 267/141.5, 141.7, 152, 153, 294; 280/124.147, 124.155, 124.151, 280/124.177, 124.179, 124.145
See application file for complete search history.

(56) References Cited

U.S. PATENT DOCUMENTS

| 5,975,505 A | * | 11/1999 | Yoshimoto | ........... | B60G 15/068 267/141.1 |
| 2016/0052358 A1 | * | 2/2016 | Itsuji | ..................... | B60G 11/52 267/33 |

FOREIGN PATENT DOCUMENTS

| JP | H10-184752 A | 7/1998 |
| JP | 2001-140964 A | 5/2001 |
| JP | 2009-108921 A | 5/2009 |
| JP | 2013-092219 A | 5/2013 |

* cited by examiner

*Primary Examiner* — Pamela Rodriguez
(74) *Attorney, Agent, or Firm* — Oliff PLC

(57) ABSTRACT

The invention relates to a suspension insulator secured to a spring seat. The insulator has a cylindrical wall part and an annular body part. When the insulator is secured to the spring seat, an inner peripheral wall surface of the body part of the insulator and at least a part of an inner peripheral wall surface of the cylinder part of the insulator are not in contact with a cylindrical wall part of the spring seat. The remaining of the inner peripheral wall surface of the cylinder part of the insulator is in tight contact with the cylindrical wall part of the spring seat when the insulator is secured to the spring seat.

5 Claims, 6 Drawing Sheets

SUSPENSION INSULATOR

BACKGROUND OF THE INVENTION

Field of the Invention

The invention relates to a suspension insulator positioned between a coil spring of a suspension device and a spring seat of the suspension device.

Description of the Related Art

Conventionally, a suspension insulator made of a rubber material as a resilient body is positioned between a coil spring of a suspension device and a spring seat of the suspension device for preventing a vibration of the coil spring from being input directly to a vehicle body. This insulator is also referred to as "coil spring insulator" and hereinafter, will be simply referred to as "insulator".

As shown in FIG. 6(A), an insulator 100 of the related art has a cylindrical part 101 and an annular body part 102 extending radially outwardly from an end of the cylindrical part 101. A cylindrical peripheral wall part 111 of a spring seat 110 is inserted into a space defined by inner peripheral wall surfaces of the cylindrical and body parts 101 and 102. In other words, the insulator 100 tightens the peripheral wall part 111 by the inner peripheral wall surfaces of the cylindrical and body parts 101 and 102 and thereby, the insulator 100 is held on the spring seat 110.

Further, the body part 102 is clamped by an upper side coil end Sg of the coil spring and a flange part 112 of the spring seat 110 (for example, see JP 2009-108921 A).

SUMMARY OF THE INVENTION

The insulator 100 is made of the rubber material and thus, a friction coefficient of a wall surface of the insulator 100 is relatively large. Thus, in case that a difference (a so-called fastening margin) between a diameter of an outer peripheral wall surface of the peripheral wall part 111 of the spring seat 110 and a diameter of an inner peripheral wall surface of the insulator 100 is large, a frictional force (a friction resistance) between the outer peripheral wall surface of the peripheral wall part 111 and the inner peripheral wall surface of the insulator 100 is large. Further, in case that the fastening margin is relatively small, a cross-sectional area of the body part 102 is particularly large and thus, a spring constant (a resistant force) in a direction of an expansion of a circumference of the body part 102 is large. As a result, a large frictional force is generated between the outer peripheral wall surface of the peripheral wall part 111 and the inner peripheral wall surface of the insulator 100. Therefore, the spring seat 110 is unlikely to be inserted into the insulator 100 of the related art and thus, a large force is needed to mount the insulator 100 on the spring seat 110. As a result, there is a problem that an operation efficiency of the assembling is relatively low. In addition, the insulator 100 cannot be brought into tight contact with the flange part 112 of the spring seat 110 and thus, a floating may be generated partially. To the contrary, if the fastening margin is excessively decreased in order to reduce a force necessary to mount, the insulator 100 may unintentionally drop out of the spring seat 110 during the assembling operation and thus, there is a problem that the assembling operation efficiency is relatively low.

Further, since a large force is necessary for mounting the insulator 100, an operator may excessively press the insulator 100 toward the flange part 112 of the spring seat 110. In this case, the inner peripheral wall surface of the body part 102 is pulled by the outer peripheral wall surface of the peripheral wall part 111 in a direction opposite to a direction of pressing the insulator 100. As a result, for example, as shown in FIG. 6(B), an outer peripheral edge portion of the body part 102 is often turned away from the flange part 112 by an internal stress generated in the insulator 100. In addition, in case that a fastening margin is provided between the inner peripheral wall surface of the body part 102 and the outer peripheral wall surface of the peripheral wall part 111, a flatness of the body part 102 cannot be maintained and thus, for example, as shown in FIG. 6(B), the body part 102 may be turned (rolled back). When the outer peripheral edge portion of the body part 102 is turned (rolled back) with respect to the flange part 112, an area where the body part 102 is in tight contact with the flange part 112 is small. Thus, a frictional force generated between the body and flange parts 102 and 112 is small.

On the other hand, the coil spring is formed by winding a wire in a coil shape. Therefore, when the coil spring elongates and contracts, as shown by an arrow in FIG. 6(C), a radius of the coil end Sg increases and decreases. In other words, the coil end Sg pressed onto the body part 102 moves radially outwardly and inwardly of the body part 102 due to the elongation and the contraction of the coil spring. As a result, the body part 102 is subject to forces radially outwardly and inwardly. At this time, in case that the body part 102 is not in tight contact with the flange part 112 with a large area as designed since the outer peripheral edge portion of the body part 102 is turned with respect to the flange part 112, the body part 102 is gradually moved with respect to the flange part 112 by the elongation and the contraction of the coil spring. As a result, the body part 102 is rubbed against the flange part 112 due to the elongation and the contraction of the coil spring and thus, an abnormal noise may be generated. Further, an abnormal noise may be generated by a metal contact of the coil spring with the spring seat.

The invention is to solve the problems described above and the object of the invention is to provide a suspension insulator which can easily be assembled to an appropriate position without unintentionally dropping out of the spring seat and can reduce a frequency of the generation of the problems such as the generation of the abnormal noise described above.

A suspension insulator (18) according to the invention is provided between a coil spring (14) of a suspension device (10) and a spring seat (17) of the suspension device (10). The spring seat (17) has a cylindrical peripheral wall part (17a) having an outer peripheral wall surface (17as), and an annular flange part (17b) extending radially outwardly from an axial end of the peripheral wall part (17a) and having a wall surface (17b1) at the side of the peripheral wall part (17a).

Further, the insulator (18) according to the invention is formed of a resilient body and comprises a cylindrical part (18a) having an inner peripheral wall surface (18as, 181 to 184), and an annular body part (18b) extending radially outwardly from an end of the cylindrical part (18a) and having an inner peripheral wall surface (18bs). The body part (18b) has a first wall surface (18b1) opposite to the cylindrical part (18a), and a second wall surface (18b2) at the side of the cylindrical part (18a).

In the insulator (18) according to the invention, the inner peripheral wall surface (18as) of the cylindrical part (18a) and the inner peripheral wall surface (18bs) of the body part (18b) defines a space into which the peripheral wall part (17a) is inserted when the insulator (18) is secured to the spring seat (17).

Further, the first wall surface (18*b*1) is in contact with the wall surface (17*b*1) of the flange part (17*b*) at the side of the peripheral wall part (17*a*) under the state that the insulator (18) is secured to the spring seat (17).

Furthermore, the second wall surface (18*b*2) is in contact with a coil end (14*b*) of the coil spring (14) when the coil spring (14) is seated on the insulator (18).

In order to accomplish the object of the invention described above, a first portion (184) of the inner peripheral wall surface (18*as*) of the cylindrical part (18*a*) between a first boundary plane (N1, P3) and a second boundary plane (N2, P4) has a first diameter (Φ3) smaller than a diameter (Φ0) of the outer peripheral wall surface (17*as*) of the peripheral wall part (17*a*) under the state that the insulator (18) is not secured to the spring seat (17).

The first boundary plane (N1, P3) is located apart from a body part reference plane (P0) corresponding to a boundary plane between the cylindrical and body parts (18*a* and 18*b*) by a first distance (D1). The second boundary plane (N2, P4) is located apart from the first boundary plane (N1, P3) in a direction apart from the body part (18*b*) by a second distance (D2).

Further, the first portion (184) is configured to be a tight-contact wall surface which is in tight contact with the outer peripheral wall surface (17*as*) of the peripheral wall part (17*a*) under the state that the insulator (18) is secured to the spring seat (17).

In addition, the entire inner peripheral wall surface (18*bs*) of the body part (18*b*) and at least a part of a second portion (181 to 183) of the inner peripheral wall surface (18*as*) of the cylindrical part (18*a*) between the body part reference plane (P0) and the first boundary plane (N1, P3) each has a second diameter larger than the first diameter (D3) under the state that the insulator (18) is not secured to the spring seat (17).

Further, the entire inner peripheral wall surface (18*bs*) of the body part (18*b*) and the at least a part of the second portion (181 to 183) are configured to be non-tight-contact wall surfaces, respectively, which are not in tight contact with the outer peripheral wall surface (17*as*) of the peripheral wall part (17*a*) under the state that the insulator (18) is secured to the spring seat (17).

In the insulator of the related art, the inner peripheral wall surfaces of the body and cylindrical parts are in contact or tight contact with the outer peripheral wall surface of the peripheral wall part of the spring seat. To the contrary, in the insulator according to the invention, the first portion of the inner peripheral wall surface of the cylindrical part between the first and second boundary planes is in contact or tightly contact with the outer peripheral wall surface of the peripheral wall part. On the other hand, the entire inner peripheral wall surface of the body part and the at least a part of the second portion of the inner peripheral wall surface of the cylindrical part between the body part reference plane and the first boundary plane are not in contact or tight contact with the outer peripheral wall surface of the peripheral wall part.

Therefore, an area for generating a frictional force between the insulator and the spring seat in the invention is considerably smaller than the area for generating the frictional force between the insulator and the spring seat in the related art and thus, a frictional force (a frictional resistance) can be reduced while the insulator is secured to the spring seat. Thereby, the insulator can be easily secured to the spring seat at an appropriate position with a small force. On the other hand, while the insulator is secured to the spring seat, a friction force is generated between the tight-contact wall surface and the outer peripheral wall surface of the peripheral wall part to the extent that the insulator does not drop out of the spring seat. Therefore, while the suspension device including the insulator is assembled to the vehicle body, the insulator can be prevented from dropping out and thus, an operation efficiency of the assembling of the suspension device can be improved.

In addition, the inner peripheral wall surface of the body part is the non-tight-contact wall surface. Further, the first portion of the inner peripheral wall surface of the cylindrical part between the first and second boundary planes is the tight-contact wall surface and thus, the tight-contact wall surface is located apart from the body part. Therefore, even when the cylindrical part of the insulator is excessively pressed toward the flange part of the spring seat, the inner peripheral wall surface of the body part may not be pulled by the outer peripheral wall surface of the peripheral wall part of the spring seat and a force which the tight-contact wall surface receives from the outer peripheral wall surface of the peripheral wall part, can be easily absorbed by a resilient deformation of the insulator. As a result, a flatness of the first wall surface of the body part of the insulator and thus, the first wall surface is in contact with the wall surface of the flange part of the spring seat at the side of the peripheral wall part with a large contact area.

Therefore, when the coil end of the coil spring is seated on the body part, the coil end of the coil spring strongly presses the body part toward the flange part to thereby generate a large frictional force between the body and flange parts. As a result, even when the coil end moves radially due to the elongation and the contraction of the coil spring, the body part can be prevented from moving with respect to the flange part. Therefore, a generation of an abnormal noise due to a rubbing of the body part against the flange part can be prevented.

Further, the non-tight-contact wall surface (183) between the first boundary plane (N1, P3) and a third boundary plane (N3, P2) may be preferably configured to be a tapered wall surface having a diameter which increases from the first diameter (Φ3) as the tapered wall surface approaches the first wall surface (18*b*1) of the body part (18*b*) under the state that the insulator (18) is not secured to the spring seat (17). The third boundary plane (N3, P2) is located apart from the first boundary plane (N1, P3) by a third distance (D3) in a direction toward the first wall surface (18*b*1) of the body part (18*b*).

In this case, while the peripheral wall part of the spring seat is inserted into the space defined by the inner peripheral wall surface of the cylindrical part of the insulator from the side of the body part of the insulator, if the peripheral wall part brings into contact with the tapered wall surface, the insulator is guided by the tapered wall surface coaxially with the spring seat. Therefore, even if it is difficult for an operator to visually confirm a securing state between the insulator and the spring seat, the operator can easily appropriately secure the insulator to the spring seat.

Further, the second boundary plane (N2, P4) may be preferably located at a position corresponding to an end of the cylindrical part (18*a*) opposite to the body part (18*b*).

In this case, a distance between the body part and the tight-contact wall surface can be increased without excessively increasing an axial length of the insulator.

Further, the portion (184) of the cylindrical part (18*a*) defining the tight-contact wall surface may preferably have a thickness smaller than a thickness of the portion of the cylindrical part (18*a*) defining the non-tight-contact wall surface.

In this case, the portion of the cylindrical part defining the tight-contact wall surface is thinned. Thereby, for example, even when the diameter of the outer peripheral wall surface of the peripheral wall part of the spring seat is a maximum value within a range of a tolerance and the diameter of the tight-contact wall surface of the insulator is a minimum value within the range of the tolerance, a generation of an excessive tightening force due to an increasing of the diameter of the portion of the cylindrical part defining the tight-contact wall surface by the peripheral wall part of the spring seat, can be prevented. Therefore, the frictional force generated between the tight-contact wall surface and the outer peripheral wall surface of the peripheral wall part can be maintained at a small value. As a result, the frictional force can be reduced while the insulator is secured to the spring seat to the extent that the insulator can be prevented from dropping out of the spring seat.

Further, a maximum value (T2) of the thickness of the cylindrical part (18a) may be preferably smaller than a thickness (T1) of the body part (18b).

In this case, the cylindrical part is likely to easily be resiliently deformed and the body part is unlikely to be resiliently deformed. Therefore, for example, in case that a force is input from the tight-contact wall surface of the cylindrical part to the cylindrical part while the insulator is secured to the spring seat and/or in case that the body part is excessively pressed toward the flange part of the spring seat and a large force is input from the flange part to the body part while the insulator is secured to the spring seat, such a force can be easily absorbed by the deformation of the cylindrical part without deforming the body part. Therefore, a possibility that the outer peripheral edge portion of the body part is turned away from the flange part can be reduced and thus, a frequency of the generation of the abnormal noise described above can be reduced.

Note that in the above description, for facilitating an understanding of the invention, components of the invention corresponding to the components of an embodiment are accompanied with symbols used in a description of the embodiment, using parentheses, respectively. However, the components of the invention are not limited to the components of the embodiment defined by the symbols, respectively.

DESCRIPTION OF THE PREFERRED EMBODIMENTS

Figure 1:
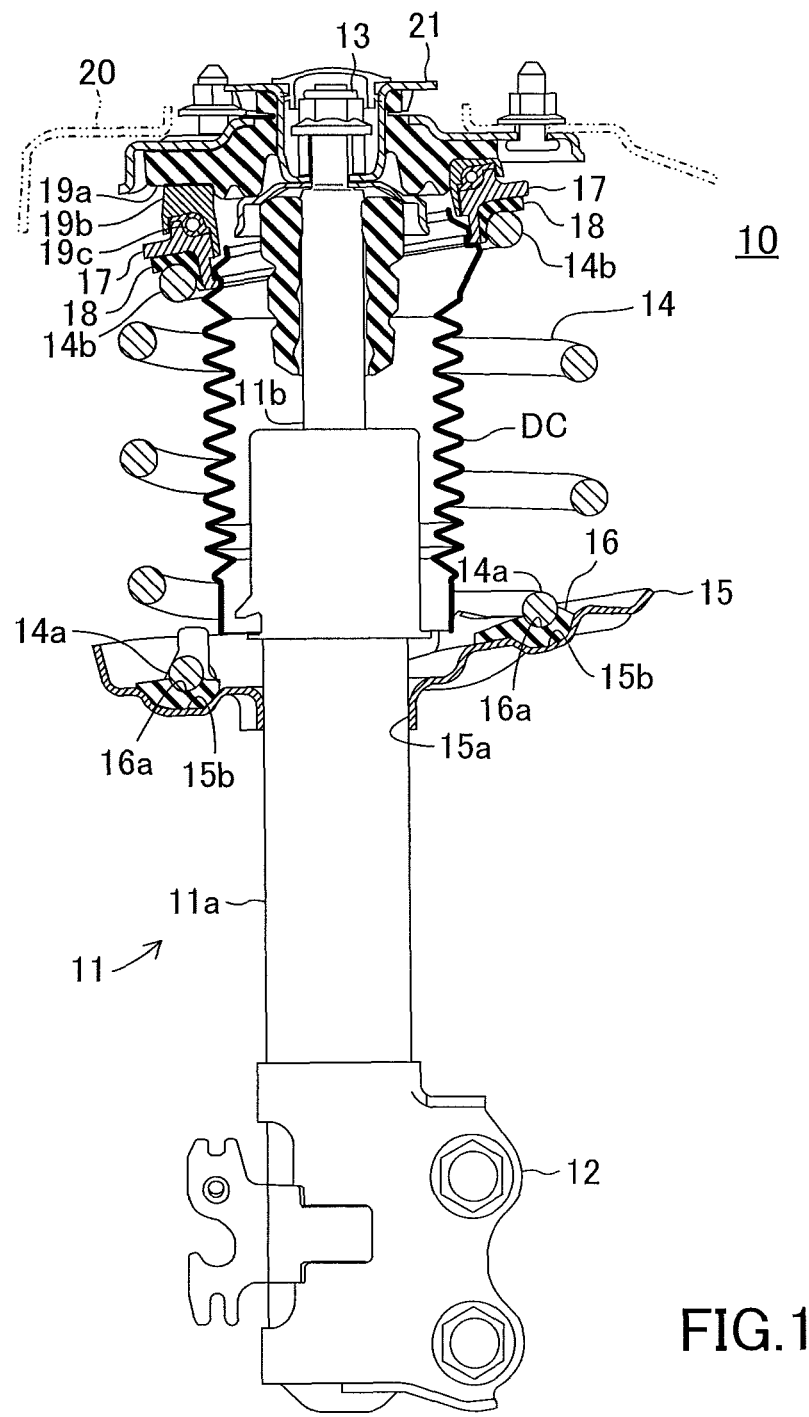
FIG. 1 is a schematic configuration view showing a suspension device to which a suspension insulator according to an embodiment of the invention is assembled.

Below, a suspension insulator (a suspension upper insulator) according to an embodiment of the invention will be described with reference to the drawings. The insulator according to this embodiment is one of components which configure a suspension device 10 shown in FIG. 1.

<Configuration>

The suspension device 10 is a strut type of a suspension device. The suspension device 10 has a shock absorber 11, a bracket 12, a nut 13, a coil spring 14, a lower spring seat 15, a lower insulator 16, an upper spring seat 17, an upper insulator 18 and the like.

The shock absorber 11 has a cylinder 11a and a piston rod 11b. A lower end of the cylinder 11a is secured to a vehicle wheel side member (for example, a suspension arm and the like not shown) via the bracket 12. An upper end of the piston rod 11b is fastened to an upper support 21 secured to a vehicle body 20 by the nut 13. As a result, the shock absorber 11 is mounted on a vehicle such that an axis of the shock absorber 11 is substantially paralleled to a vehicle vertical direction.

The coil spring 14 is a spring formed by winding a metal wire in a coil shape. The coil spring 14 is positioned at an outer periphery side of the shock absorber 11 such that the shock absorber 11 is inserted in an inner periphery side of the coil spring 14.

The lower spring seat 15 is formed as a metal circular plate having a circular opening 15a formed in a central area of the plate and an annular groove 15b formed around the opening 15a. The lower spring seat 15 is fixed to the cylinder 11a by welding an edge defining the circular opening 15a of the lower spring seat 15 to an outer periphery of the cylinder 11a under the state that the cylinder 11a is inserted through the circular opening 15a.

The lower insulator 16 is formed as an annular member made of a rubber as a resilient material. The lower insulator 16 is positioned and secured in the annular groove 15b on an upper wall surface of the lower spring seat 15. An annular seat groove 16a is formed in an upper wall surface of the lower insulator 16. A coil end 14a (hereinafter, will be referred to as "lower side coil end") corresponding to a lower side part (a lower end) of the coil spring 14 is seated in the seat groove 16a. As a result, the coil spring 14 is supported by the lower spring seat 15 via the lower insulator 16.

The lower insulator 16 prevents the metal lower side coil end 14a from being brought into contact with the metal lower spring seat 15. Therefore, the lower insulator 16 can prevent an abnormal noise from being generated due to the contact of the lower side coil end 14a with the lower spring seat 15.

The upper spring seat 17 is made of a metal (or a resin). The upper spring seat 17 is supported rotatably with respect to the upper support 21 via a backside member 19a fixed to the upper support 21, a base member 19b fixed to the backside member 19a and a strut bearing 19c fixed to the base member 19b. Note that the upper spring seat 17 may be supported rotatably with respect to the upper support 21 via the strut bearing 19c fixed to the upper support 21 as a separate part.

Figure 2:
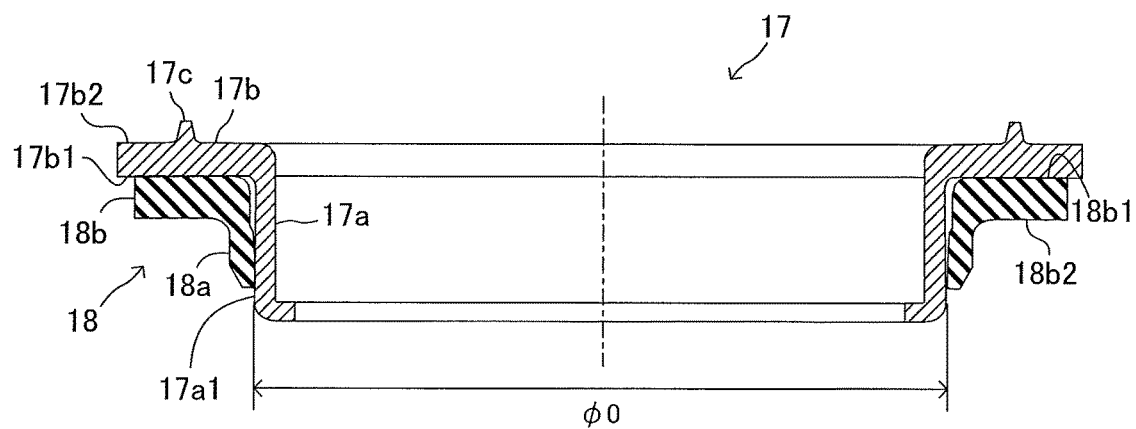
FIG. 2 is a cross sectional view showing an upper spring seat and an upper insulator shown in FIG. 1.

As shown in FIG. 2, the upper spring seat 17 has a cylindrical peripheral wall part 17a and an annular flange part 17b extending radially outwardly from an axial end (hereinafter, will be also referred to as "upper end" for convenience) of the peripheral wall part 17a. Thereby, the flange part 17b is coaxial with the peripheral wall part 17a. An outer diameter (a diameter of an outer peripheral wall surface) of the peripheral wall part 17a is Φ0. The flange part 17b has a wall surface 17b1 (hereinafter, will be also referred to as "lower wall surface 17b1") which is a wall surface at the side of the peripheral wall part 17a and a wall surface 17b2 (hereinafter, will be also referred to as "upper wall surface 17b2") which is a wall surface opposite to the lower wall surface 17b1. The lower and upper wall surfaces 17b1 and 17b2 are opposed to each other and are generally parallel to each other. An annular projection 17c is formed on the upper wall surface 17b2.

Figure 3:
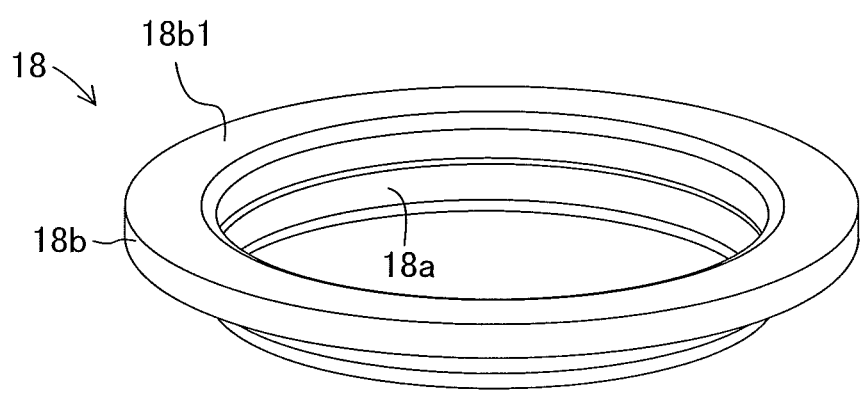
FIG. 3 is a perspective view showing the upper insulator shown in FIG. 1.

The upper insulator 18 is formed as an annular member made of a rubber as a resilient material. As shown in FIGS. 1 to 3, the upper insulator 18 has a cylindrical part 18a having a cylindrical shape and an annular body part 18b extending radially outwardly from an end (hereinafter, will be also referred to as "upper end" for convenience) of the cylindrical part 18a. Thereby, the body part 18b is coaxial with the cylindrical part 18a. The peripheral wall part 17a of the spring seat 17 is inserted in a space define by inner peripheral wall surfaces of the cylindrical and body parts 18a and 18b.

Figure 4:
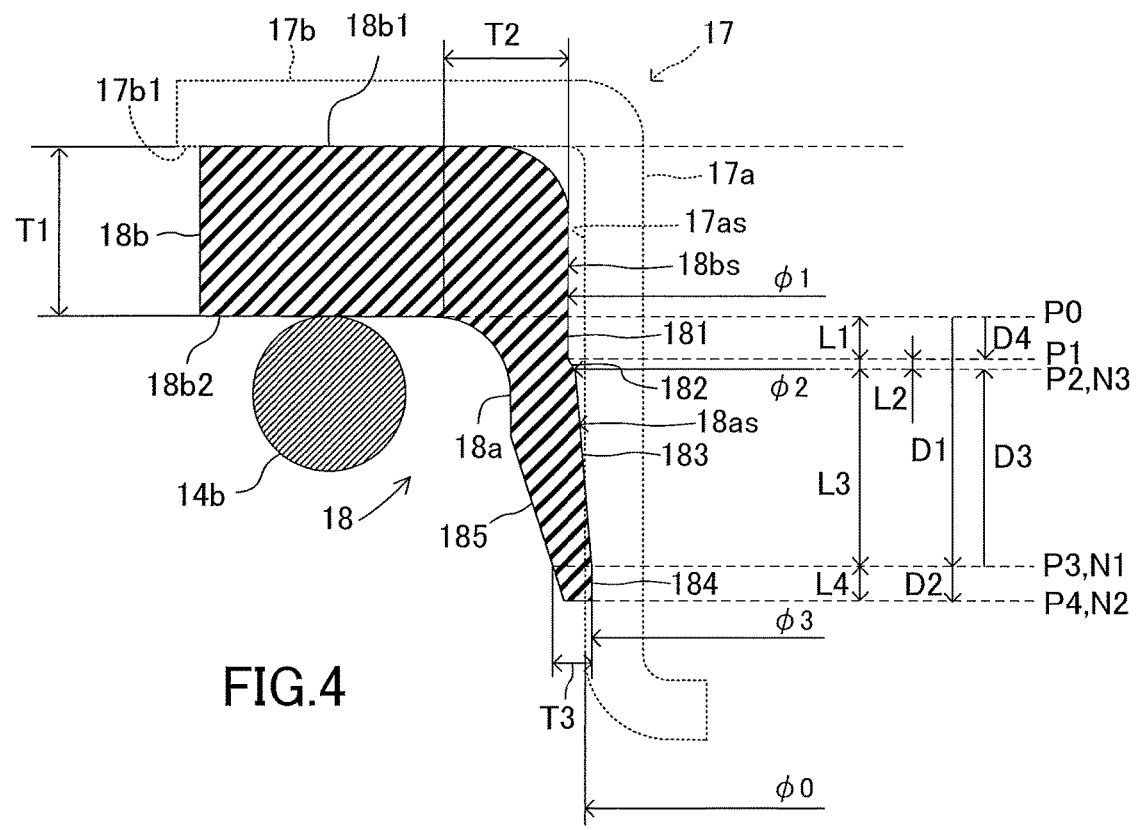
FIG. 4 is a partial enlarged cross sectional view showing the upper insulator shown in FIG. 1.

The body part 18b has a first wall surface 18b1 which is a wall surface on the opposite side of the cylindrical part 18a and a second surface 18b2 which is a wall surface at the side of the cylindrical part 18a. For convenience, the first and second wall surfaces 18b1 and 18b2 will be also referred to as "upper wall surface 18b1" and "lower wall surface 18b2", respectively. The first and second wall surfaces 18b1 and 18b2 are opposed to each other and are generally parallel to each other. Under the state that the upper insulator 18 is mounted on the upper spring seat 17, the first wall surface (the upper wall surface) 18b1 is in tight contact with the lower wall surface 17b1 of the flange part 17b of the upper spring seat 17. Further, as shown in FIGS. 1 and 4, the second wall surface (the lower wall surface) 18b2 is in contact with a coil end 14b (hereinafter, will be referred to as "upper side coil end 14b") corresponding to an upper part (an upper end) of the coil spring 14. That is, the upper side coil end 14b is seated on the second wall surface 18b2. As a result, the coil spring 14 is held between the lower and upper spring seats 15 and 17. Further, the body part 18b of the upper insulator 18 is clamped by the upper side coil end 14b and the flange part 17b of the upper spring seat 17.

The upper insulator 18 prevents the metal upper side coil end 14b from being brought into contact with the metal upper spring seat 17. Therefore, the upper insulator 18 can prevent an abnormal noise from being generated due to the contact of the upper side coil end 14b with the upper spring seat 17.

As shown in FIG. 1, a dust cover DC is provided on the suspension device 10. Note that the detailed description of the dust cover DC will be omitted since the dust cover DC is not any essential component of the invention. The dust cover DC is provided at an inner side of the coil spring 14 and prevents contaminants from adhering to an outer peripheral wall surface (a sliding wall surface) of the piston rod 11b of the shock absorber 11.

Figure 5:
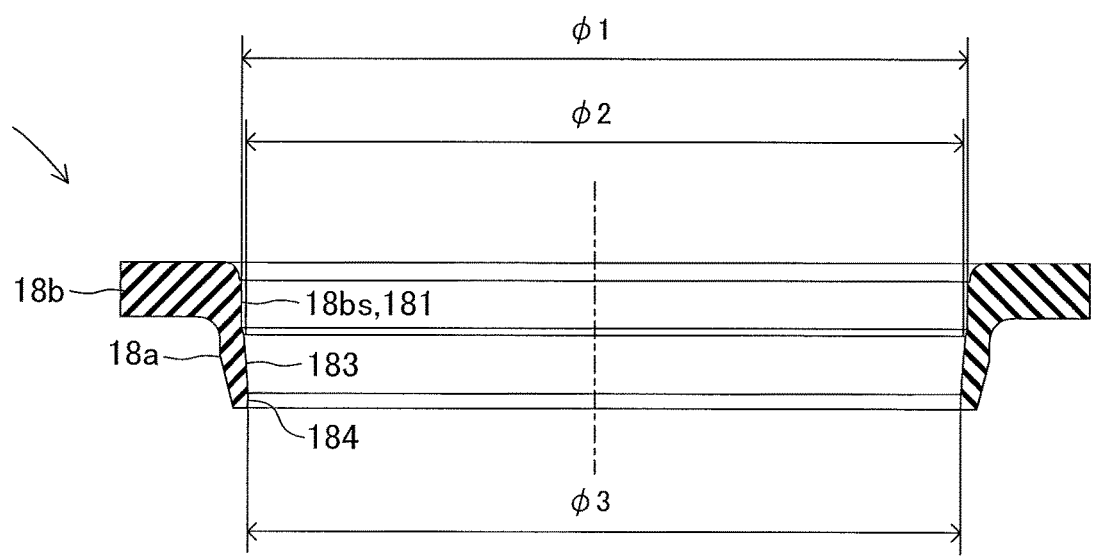
FIG. 5 is a cross sectional view showing the upper insulator shown in FIG. 1.
Figure 6A:
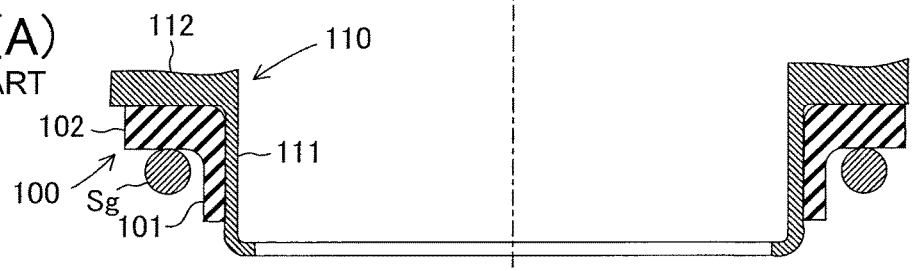
FIG. 6(A) is a cross sectional view showing an insulator and a spring seat of a related art.
Figure 6B:
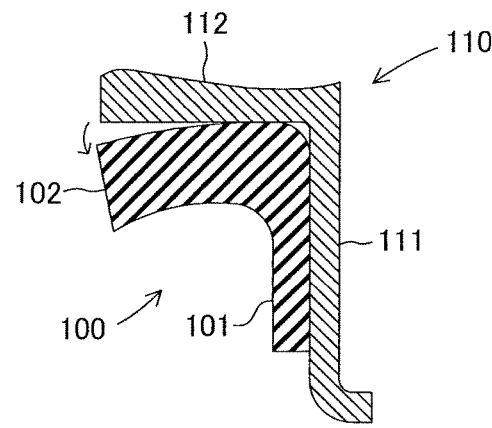
FIGS. 6(B) and 6(C) are partial enlarged cross sectional view showing the insulator of the related art inappropriately assembled to the spring seat, respectively.
Figure 6C:
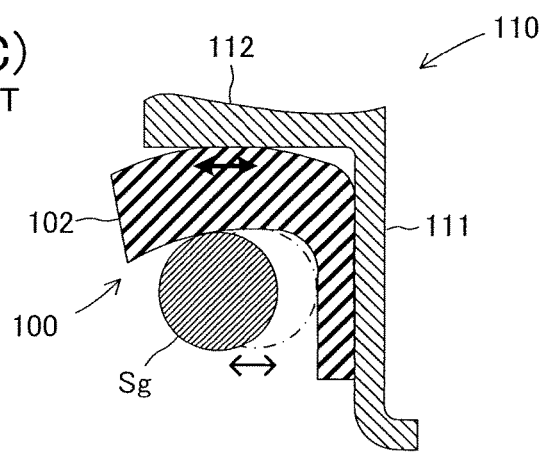

Below, a shape of the upper insulator 18 will be described in detail mainly with reference to the FIGS. 4 and 5.

An axial thickness (a plate thickness) T1 of the annular body part 18b is larger than a thickness T2 of a portion having a largest axial thickness (a largest plate thickness) of the cylindrical part 18a (that is, a portion of the cylindrical part 18a on the same plane as the second wall surface 18b2 of the body part 18b) (a maximum value T2 of the axial thickness of the cylindrical part 18a).

The body part 18b has an inner peripheral wall surface 18bs opposed to an outer peripheral wall surface 17as of the peripheral wall part 17a of the upper spring seat 17 under the state that the upper insulator 18 is secured to the upper spring seat 17. A diameter $\Phi1$ of the inner peripheral wall surface 18bs (that is, an inner diameter $\Phi1$ of the body part 18b) is larger than a diameter $\Phi0$ of the outer peripheral wall surface 17as (that is, an outer diameter $\Phi0$ of the peripheral wall part 17a) ($\Phi1 > \Phi0$). Therefore, there is no fastening margin between the inner peripheral wall surface 18bs and the outer peripheral wall surface 17as of the peripheral wall part 17a and thus, under the state that the upper insulator 18 is secured to the upper spring seat 17, the inner peripheral wall surface 18bs is not brought into contact or tight contact with the outer peripheral wall surface 17as. For convenience, also referred to as "non-tight-contact wall surface" will be the inner peripheral wall surface of the upper insulator 18 such as the inner peripheral wall surface 18bs which is not brought into tight contact with the outer peripheral wall surface 17as.

The cylindrical part 18a has an inner peripheral wall surface 18as opposed to the outer peripheral wall surface 17as under the state that the upper insulator 18 is secured to the upper spring seat 17. As described below, the inner peripheral wall surface 18as can be separated into four portions 181 to 184. Note that the term "lower" in the following description is used for expressing a direction toward a lower end of the cylindrical part 18a along an axis of the cylindrical part 18a, that is, as a direction toward an end of the cylindrical part 18a opposite to an end where the body part 18b is provided.

(1) The first cylindrical part inner peripheral wall surface 181 is a portion of the inner peripheral wall surface 18as located between a body part reference plane P0 and a boundary plane P1. The body part reference plane P0 corresponds to a boundary plane between the cylindrical part 18a and the body part 18b. The boundary plane P1 corresponds to a plane located downwardly apart from the body part reference plane P0 by a distance L1. Note that the body part reference plane P0 is located on the same plane as the second wall surface (the lower wall surface) 18b2 of the body part 18b.

(2) The second cylindrical part inner peripheral wall surface 182 is a portion of the inner peripheral wall surface 18as between the boundary plane P1 and a second boundary plane P2 located downwardly apart from the boundary plane P1 by a distance L2. Note that for convenience, the boundary plane P2 will be also referred to as "third boundary plane N3".

(3) The third cylindrical part inner peripheral wall surface 183 is a portion of the inner peripheral wall surface 18as between the boundary plane P2 and a boundary plane P3 located downwardly apart from the boundary plane P2 by a distance L3. Note that for convenience, the boundary plane P3 will be also referred to as "first boundary plane N1".

(4) The fourth cylindrical part inner peripheral wall surface 184 is a portion of the inner peripheral wall surface 18as between the boundary plane P3 and a boundary plane P4 located downwardly apart from the boundary plane P3 by a distance L4. Note that for convenience, the boundary plane P4 will be also referred to as "second boundary plane N2". Further, the boundary plane P4 corresponds to a lower end of the cylindrical part 18a (an end of the cylindrical part 18a opposite to the body part 18b).

A relationship in magnitude among the distances L1 to L4 is as in a following inequality expressions.

Distance L2<Distance L4<Distance L1<Distance L3

Further, for convenience, a sum of the distances L1, L2 and L3 will be also referred to as "first distance D1" (D1=L1+L2+L3). For convenience, the distance L4 will be also referred to as second distance D2". For convenience, the distance L3 will be also referred to as "third distance D3".

Next, diameters (radii) of the inner peripheral wall surfaces 181 to 184 will be described, respectively. The diameters described herein are diameters under the state that the upper insulator 18 is not mounted on the upper spring seat 17 (the upper insulator 18 is under a free state).

The diameter of the first cylindrical part inner peripheral wall surface 181 is a constant value Φ1 equal to the diameter Φ1 of the inner peripheral wall surface 18bs of the body part 18b and thus, the diameter of the first cylindrical part inner peripheral wall surface 181 is larger than the diameter Φ0 of the outer peripheral wall surface 17as (Φ1>Φ0). Thus, there is no fastening margin between the first cylindrical part inner peripheral wall surface 181 and the outer peripheral wall surface 17as of the peripheral wall part 17a. Therefore, when the upper insulator 18 is mounted on the upper spring seat 17, the first cylindrical part inner peripheral wall surface 181 is not brought into contact or tight contact with the outer peripheral wall surface 17as. In other words, the first cylindrical part inner peripheral wall surface 181 is also a non-tight-contact wall surface.

The diameter of the second cylindrical part inner peripheral wall surface 182 is Φ1 at the boundary plane P1 and Φ2 at the boundary plane P2. Φ2 is smaller than Φ1 and larger than Φ0 (Φ0<Φ2<Φ1). The diameter of the second cylindrical part inner peripheral wall surface 182 continuously decreases downwardly from the boundary plane P1 toward the boundary plane P2. Therefore, when the upper insulator 18 is mounted on the upper spring seat 17, the second cylindrical part inner peripheral wall surface 182 is not brought into contact or tight contact with the outer peripheral wall surface 17as. In other words, the second cylindrical part inner peripheral wall surface 182 is also a non-tight-contact wall surface. Note that since the distance L2 is relatively small, the second cylindrical part inner peripheral wall surface 182 can be said as a wall surface tapered at a relatively large angle.

The diameter of the third cylindrical part inner peripheral wall surface 183 is Φ2 at the boundary plane P2 and Φ3 at the boundary plane P3. For convenience, Φ3 will be also referred to as "first diameter" and is slightly smaller than Φ0. Therefore, Φ3 is obviously smaller than Φ2 and Φ1 (Φ3<Φ0<Φ2<Φ1). The diameter of the third cylindrical part inner peripheral wall surface 183 continuously decreases downwardly from the boundary plane P2 toward the boundary plane P3. Since the distance L3 is relatively large (is considerably larger than the distance L2), the third cylindrical part inner peripheral wall surface 183 can be said as a wall surface tapered at a relatively small angle.

The diameter of the fourth cylindrical part inner peripheral wall surface 184 is a constant value Φ3. As described above, Φ3 is slightly smaller than the diameter Φ0 of the outer peripheral wall surface 17as (Φ3<Φ0). Thereby, there is a fastening margin (=Φ0-Φ3) between the fourth cylindrical part inner peripheral wall surface 184 and the outer peripheral wall surface 17as of the peripheral wall part 17a. Thus, when the upper insulator 18 is secured to the upper spring seat 17, the fourth cylindrical part inner peripheral wall surface 184 is brought into contact or tight contact with the outer peripheral wall surface 17as. In other words, the fourth cylindrical part inner peripheral wall surface 184 is a tight-contact wall surface which is in tight contact with the peripheral wall part 17a.

Note that the diameter of the third cylindrical part inner peripheral wall surface 183 is the minimum value Φ3 at the boundary plane P3, however, when the upper insulator 18 is mounted on the upper spring seat 17, the diameter of the third cylindrical part inner peripheral wall surface 183 at the boundary plane P3 becomes equal to the diameter Φ0 of the outer peripheral wall surface 17as. Therefore, the third cylindrical part inner peripheral wall surface 183 is not brought into contact or tight contact with the outer peripheral wall surface 17as. Thereby, the third cylindrical part inner peripheral wall surface 183 is also a non-tight-contact wall surface.

Further, a tapered wall surface 185 is formed on the opposite side of the third and fourth cylindrical part inner peripheral wall surfaces 183 and 184 of the cylindrical part 18a. The wall surface 185 is tapered at an angle larger than the angle of the tapered wall surface which is the third cylindrical part inner peripheral wall surface 183. Further, the tapered wall surface 185 is formed between a position corresponding to a generally axially center of the third cylindrical part inner peripheral wall surface 183 and an lower end of the fourth cylindrical part inner peripheral wall surface 184. Further, a diameter (an outer peripheral diameter) of the tapered wall surface 185 decreases toward the lower end of the fourth cylindrical part inner peripheral wall surface 184.

As a result, a maximum value T3 of a radial thickness (a plate thickness) of a portion of the cylindrical part 18a corresponding to the fourth cylindrical part inner peripheral wall surface 184, is smaller than the maximum value T2 of the radial thickness of the cylindrical part 18a and thus, is obviously smaller than the axial thickness (the plate thickness) T1 of the body part 18b. In other words, a thickness (a radial thickness) of the cylindrical part 18a corresponding to a portion forming the tight-contact wall surface is smaller than a thickness (a radial thickness) of the cylindrical part 18a corresponding to a portion forming the non-tight-contact wall surface. Further, the thickness (the radial thickness) of the cylindrical part 18a is smaller than the thickness (the axial thickness) of the body part 18b.

<Function>

In order to assemble the suspension device 10 having the configuration described above to the vehicle body 20, the upper spring seat 17 is fixed to the upper support 21. The upper insulator 18 is secured to the upper spring seat 17 fixed to the upper support 21. In particular, the upper insulator 18 is secured to the upper spring seat 17 such that the peripheral wall part 17a of the upper spring seat 17 is inserted into the space defined by the inner peripheral wall surfaces of the body and cylindrical parts 18b and 18a of the upper insulator 18. At this time, the upper insulator 18 is guided by the third cylindrical part inner peripheral wall surface 183 while the tapered third cylindrical part inner peripheral wall surface 183 is brought into contact with the outer peripheral wall surface 17as of the peripheral wall part 17a of the upper spring seat 17. Therefore, the upper insulator 18 can be easily coaxially secured to the upper spring seat 17.

Further, the diameter (the inner diameter) of the fourth cylindrical part inner peripheral wall surface 184 (that is, the tight-contact wall surface) of the cylindrical part 18a is set to the diameter Φ3 slightly smaller than the diameter Φ0 of the outer peripheral wall surface 17as of the peripheral wall part 17a. Thereby, when the upper insulator 18 is pressed onto the upper spring seat 17 until the fourth cylindrical part inner peripheral wall surface 184 is brought into contact with the outer peripheral wall surface 17as, the portion of the cylindrical part 18a defining the fourth cylindrical part inner peripheral wall surface 184 is expanded. Therefore, the expanded portion tightens the peripheral wall part 17a (the outer peripheral wall surface 17as) and thus, a frictional force is generated between the fourth cylindrical part inner peripheral wall surface (the tight-contact wall surface) 184 and the outer peripheral wall surface 17as. As a result, the upper insulator 18 can be prevented from easily dropping out of the upper spring seat 17 during the assembling of the suspension device 10.

On the other hand, as described above, in the related art, when the peripheral wall part of the upper spring seat is inserted into the space defined by the inner peripheral wall surface of the upper insulator, the large frictional force is generated between the inner peripheral wall surfaces of the cylindrical and body parts and the outer peripheral wall surface of the peripheral wall part and thus, a large force is necessary to insert the peripheral wall part into the space define by the inner peripheral wall surface of the upper insulator. To the contrary, in the upper insulator 18 according to the embodiment of the invention, the tight-contact wall surface which generates the frictional force with respect to the outer peripheral wall surface 17as of the peripheral wall part 17a is only the fourth cylindrical part inner peripheral wall surface 184. Therefore, an area of the tight-contact wall surface of the upper insulator 18 is smaller than an area of the tight-contact wall surface (a friction wall surface with respect to the outer peripheral wall surface 17as) of the insulator of the related art corresponding to the entire inner peripheral wall surface of the upper insulator (the entire inner peripheral wall surfaces of the cylindrical and body parts). Thus, the frictional force (the frictional resistance) generated during the assembling is small.

In addition, the plate thickness of a portion of the cylindrical part 18a defining the fourth cylindrical part inner peripheral wall surface 184 corresponding to the tight-contact wall surface, is the thickness T2 at a maximum and smaller than or equal to the minimum value of the plate thickness of a portion of the cylindrical part 18a defining the third cylindrical part inner peripheral wall surface 183 corresponding to the tapered wall surface. In other words, the portion of the cylindrical part 18a defining the fourth cylindrical part inner peripheral wall surface 184 is thinned. Therefore, during the assembling, the diameter of the portion of the cylindrical part 18a defining the fourth cylindrical part inner peripheral wall surface 184 corresponding to the tight-contact wall surface can be easily increased and thus, no excessive force for tightening the peripheral wall part 17a is generated.

From the two points described above (that is, the area of the tight-contact wall surface is small and the tightening force is not excessively large), the frictional force generated during the assembling of the upper insulator 18 to the upper spring seat 17 can be decreased. Therefore, the upper insulator 18 can be moved with a small force until the body part 18b of the upper insulator 18 reaches an appropriate securing position to bring the body part 18b of the upper insulator 18 into appropriate tight contact with the flange part 17b of the upper spring seat 17. Further, the frictional force is generated between the fourth cylindrical part inner peripheral wall surface 184 and the outer peripheral wall surface 17as of the peripheral wall part 17a and thus, the upper insulator 18 can be prevented from unintentionally dropping out of the upper spring seat 17 during the assembling.

In addition, the inner peripheral wall surface 18bs (the first to third cylindrical part inner peripheral wall surfaces 181 to 183) of the body part 18b are the non-tight-contact wall surfaces, respectively. Therefore, even when the cylindrical part 18a is excessively pressed toward the flange part 17b of the upper spring seat 17, the non-tight-contact wall surface including the inner peripheral wall surface 18bs of the body part 18b may not be pulled by the outer peripheral wall surface 17as of the peripheral wall part 17a of the upper spring seat 17. Further, only the fourth cylindrical part inner peripheral wall surface 184 is the tight-contact wall surface and this tight-contact wall surface is located apart from the body part 18b. Therefore, a force which the tight-contact wall surface receives from the outer peripheral wall surface 17as of the peripheral wall part 17a can be easily absorbed by a resilient deformation of the upper insulator 18 (in particular, a resilient deformation of a portion of the upper insulator 18 defining the non-tight-contact wall surface of the thinned cylindrical part 18a). As a result, a flatness of the first wall surface 18b1 of the body part 18b of the upper insulator 18 is maintained and the outer peripheral end of the body part 18b may not be turned. Therefore, the first wall surface 18b1 and the lower wall surface 17b1 of the flange part 17b of the upper spring seat 17 can be brought into contact with each other with a large contact area as designed. Thus, when the upper side coil end 14b of the coil spring 14 is seated on the body part 18b, a large frictional force is generated between the body part 18b and the flange part 17b since the body part 18b is strongly pressed toward the flange part 17b by the upper side coil end 14b. As a result, the generation of the abnormal noise described above due to the relative movement between the body part 18b and the flange part 17b can be suppressed.

As described above, when the upper insulator 18 is secured to the upper spring seat 17, the piston rod 11b of the shock absorber 11 of the suspension device 10 is inserted into the space defined by the inner peripheral wall surface of the peripheral wall part 17a of the upper spring seat 17. At this time, the upper side coil end 14b of the coil spring 14 is brought into contact with the second wall surface (the lower wall surface) 18b2 of the body part 18b of the upper insulator 18. Under this state, the upper end (a screwed part) of the piston rod 11b projecting from the upper support 21 is fastened by the nut 13 and the lower end of the cylinder 11a is secured to the vehicle wheel side member via the bracket 12. Thereby, the upper side coil end 14b is seated such that the upper side coil end 14b presses the body part 18b toward the flange part 17b. By the operation described above, the assembling of the suspension device 10 to the vehicle body 20 is completed.

As described above, the upper insulator 18 according to the embodiment can be easily assembled to the upper spring seat 17 at an appropriate position with a small force and can be prevented from unintentionally dropping out of the upper spring seat 17. Further, the generation of the abnormal noise due to the relative movement between the body and flange parts 18b and 17b can be suppressed.

The invention is not limited to the embodiment described above and various modifications can be employed within the scope of the invention.

For example, in the upper insulator 18 according to the embodiment, the third cylindrical part inner peripheral wall surface 183 is the tapered wall surface. However, the third cylindrical part inner peripheral wall surface 183 may be a wall surface having a constant diameter (for example, Φ2) larger than Φ3. Note that also in this case, the third cylindrical part inner peripheral wall surface 183 is the non-tight-contact wall surface. Further, the second and third cylindrical part inner peripheral wall surfaces 182 and 183 may have the same constant diameters Φ1 as the diameter Φ1 of the first cylindrical part inner peripheral wall surface 181, respectively or have constant diameters Φ4 smaller than Φ1 and larger than Φ0, respectively. Also in this case, the second and third cylindrical part inner peripheral wall surfaces 182 and 183 are the non-tight-contact wall surfaces, respectively.

In addition, the thickness of the portion of the cylindrical part 18a defining the fourth cylindrical part inner peripheral wall surface (the tight-contact wall surface) 184 may be a constant value smaller than or equal to the thickness T3. Further, the cylindrical part 18a may have a portion defining the non-tight-contact wall surface below the portion defining the fourth cylindrical part inner peripheral wall surface (the tight-contact surface) 184.

What is claimed is:

1. A suspension insulator provided between a coil spring of a suspension device and a spring seat of the suspension device, the spring seat having:
    a cylindrical peripheral wall part having an outer peripheral wall surface; and
    an annular flange part extending radially outwardly from an axial end of the peripheral wall part and having a wall surface at the side of the peripheral wall part,
    the insulator being formed of a resilient body and comprising;
        a cylindrical part having an inner peripheral wall surface; and
        an annular body part extending radially outwardly from an end of the cylindrical part and having an inner peripheral wall surface,
    the body part having:
        a first wall surface opposite to the cylindrical part; and
        a second wall surface at the side of the cylindrical part,
    the inner peripheral wall surface of the cylindrical part and the inner peripheral wall surface of the body part defining a space into which the peripheral wall part is inserted when the insulator is secured to the spring seat,
    the first wall surface being in contact with the wall surface of the flange part at the side of the peripheral wall part under the state that the insulator is secured to the spring seat, and
    the second wall surface being in contact with a coil end of the coil spring when the coil spring is seated on the insulator,
    wherein a first portion of the inner peripheral wall surface of the cylindrical part between a first boundary plane and a second boundary plane has a first diameter smaller than a diameter of the outer peripheral wall surface of the peripheral wall part under the state that the insulator is not secured to the spring seat, the first boundary plane being located apart from a body part reference plane corresponding to a boundary plane between the cylindrical and body parts by a first distance, the second boundary plane being located apart from the first boundary plane in a direction apart from the body part by a second distance,
    the first portion is configured to be a tight-contact wall surface which is in tight contact with the outer peripheral wall surface of the peripheral wall part under the state that the insulator is secured to the spring seat,
    the entire inner peripheral wall surface of the body part and at least a part of a second portion of the inner peripheral wall surface of the cylindrical part between the body part reference plane and the first boundary plane each has a second diameter larger than the first diameter under the state that the insulator is not secured to the spring seat, and
    the entire inner peripheral wall surface of the body part and the at least a part of the second portion are configured to be non-tight-contact wall surfaces, respectively, which are not in tight contact with the outer peripheral wall surface of the peripheral wall part under the state that the insulator is secured to the spring seat.

2. The suspension insulator as set forth in claim 1, wherein the non-tight-contact wall surface between the first boundary plane and a third boundary plane is configured to be a tapered wall surface having a diameter which increases from the first diameter as the tapered wall surface approaches the first wall surface of the body part under the state that the insulator is not secured to the spring seat, the third boundary plane being located apart from the first boundary plane by a third distance in a direction toward the first wall surface of the body part.

3. The suspension insulator as set forth in claim 1, wherein the second boundary plane is located at a position corresponding to an end of the cylindrical part opposite to the body part.

4. The suspension insulator as set forth in claim 1, wherein the portion of the cylindrical part defining the tight-contact wall surface has a thickness smaller than a thickness of the portion of the cylindrical part defining one of the non-tight-contact wall surfaces.

5. The suspension insulator as set forth in claim 1, wherein a maximum value of a thickness of the cylindrical part is smaller than a thickness of the body part.

* * * * *